(12) United States Patent
Keresman, III et al.

(10) Patent No.: US 7,742,967 B1
(45) Date of Patent: Jun. 22, 2010

(54) SECURE AND EFFICIENT PAYMENT PROCESSING SYSTEM

(75) Inventors: Michael A. Keresman, III, Kirtland Hills, OH (US); Ravishankar Bhagavatula, Beachwood, OH (US); Chandra Balasubramanian, Mentor-on-the-Lake, OH (US); Francis M. Sherwin, Cleveland Heights, OH (US)

(73) Assignee: CardinalCommerce Corporation, Mentor, OH (US)

( * ) Notice: Subject to any disclaimer, the term of this patent is extended or adjusted under 35 U.S.C. 154(b) by 682 days.

(21) Appl. No.: 09/488,297

(22) Filed: Jan. 20, 2000

Related U.S. Application Data

(60) Provisional application No. 60/157,304, filed on Oct. 1, 1999.

(51) Int. Cl.
*G06Q 40/00* (2006.01)
(52) U.S. Cl. ...................................................... 705/37
(58) Field of Classification Search .................. 705/41, 705/52, 57, 58, 65, 67, 72, 75, 44, 26–40
See application file for complete search history.

(56) References Cited

U.S. PATENT DOCUMENTS

| | | | |
|---|---|---|---|
| 3,806,874 A | 4/1974 | Ehrat | |
| 3,906,460 A * | 9/1975 | Halpern | ........................ 711/115 |
| 4,720,860 A | 1/1988 | Weiss | |
| 4,747,050 A | 5/1988 | Brachtl et al. | |
| 4,799,156 A * | 1/1989 | Shavit et al. | ................... 705/26 |
| 4,800,590 A | 1/1989 | Vaughan | |
| 4,885,778 A | 12/1989 | Weiss | |
| 5,168,520 A | 12/1992 | Weiss | |
| 5,233,655 A | 8/1993 | Shapiro | |
| 5,237,614 A | 8/1993 | Weiss | |
| 5,323,465 A * | 6/1994 | Avarne | ........................ 713/184 |

(Continued)

FOREIGN PATENT DOCUMENTS

CA 2340621 5/1999

(Continued)

OTHER PUBLICATIONS

Endeshaw, A., "The Proper Law for Electronic Commerce"; Information & Communications Technology Law. Abingdon: Mar. 1998.*

(Continued)

*Primary Examiner*—Olabode Akintola
(74) *Attorney, Agent, or Firm*—Fay Sharpe LLP

(57) ABSTRACT

A method of processing commercial transactions carried out over the Internet (50) between account holders (30) and participating merchants (20) includes receiving a purchase request (352) of a buyer from a participating merchant (20) indicating that the buyer desires to carry out a transaction with the merchant (20). The transaction includes the buyer purchasing one or more selected items (340) from the merchant (20). The buyer is authenticated (310) as an account holder (30) and transaction fulfillment data (362) is established. The transaction fulfillment data (362) indicates a delivery destination for the selected items. In turn, the transaction fulfillment data (362) is communicated to the participating merchant (20), and transaction details (384) from the participating merchant (20) are received. The transaction details (384) include a cost for the selected items. Thereafter, completion of the transaction is authorized (390) and an authorization code (392) established therefor is communicated to the participating merchant (20).

11 Claims, 8 Drawing Sheets

U.S. PATENT DOCUMENTS

| | | | |
|---|---|---|---|
| 5,361,062 A | | 11/1994 | Weiss et al. |
| 5,444,444 A | * | 8/1995 | Ross .......................... 340/994 |
| 5,479,512 A | | 12/1995 | Weiss |
| 5,485,519 A | | 1/1996 | Weiss |
| 5,491,752 A | | 2/1996 | Kaufman et al. |
| 5,557,518 A | | 9/1996 | Rosen |
| 5,590,197 A | | 12/1996 | Chen et al. |
| 5,625,694 A | * | 4/1997 | Lee et al. ..................... 705/60 |
| 5,655,023 A | * | 8/1997 | Cordery et al. ............... 380/51 |
| 5,657,388 A | * | 8/1997 | Weiss ......................... 713/185 |
| 5,692,132 A | * | 11/1997 | Hogan ......................... 705/27 |
| 5,715,314 A | | 2/1998 | Payne et al. |
| 5,742,683 A | * | 4/1998 | Lee et al. ..................... 705/60 |
| 5,742,684 A | | 4/1998 | Labaton et al. |
| 5,757,917 A | | 5/1998 | Rose et al. |
| 5,761,306 A | | 6/1998 | Lewis |
| 5,781,632 A | | 7/1998 | Odom |
| 5,790,667 A | | 8/1998 | Omori et al. |
| 5,790,677 A | | 8/1998 | Fox et al. |
| 5,809,144 A | | 9/1998 | Sirbu et al. |
| 5,815,665 A | | 9/1998 | Teper et al. |
| 5,825,881 A | | 10/1998 | Colvin, Sr. |
| 5,826,245 A | * | 10/1998 | Sandberg-Diment ......... 705/44 |
| 5,850,442 A | * | 12/1998 | Muftic ......................... 705/65 |
| 5,887,065 A | | 3/1999 | Audebert |
| 5,903,878 A | * | 5/1999 | Talati et al. ................... 705/26 |
| 5,909,492 A | | 6/1999 | Payne et al. |
| 5,937,068 A | | 8/1999 | Audebert |
| 5,943,423 A | * | 8/1999 | Muftic ......................... 705/67 |
| 5,956,699 A | | 9/1999 | Wong et al. |
| 5,987,440 A | * | 11/1999 | O'Neil et al. ................. 705/44 |
| 5,988,497 A | | 11/1999 | Wallace |
| 5,991,411 A | | 11/1999 | Kaufman et al. |
| 5,991,413 A | | 11/1999 | Arditti et al. |
| 5,995,626 A | | 11/1999 | Nishioka et al. |
| 5,999,624 A | | 12/1999 | Hopkins |
| 6,005,939 A | | 12/1999 | Fortenberry et al. |
| 6,012,039 A | * | 1/2000 | Hoffman et al. .............. 705/14 |
| 6,012,045 A | * | 1/2000 | Barzilai et al. ................ 705/37 |
| 6,014,650 A | | 1/2000 | Zampese |
| 6,029,150 A | | 2/2000 | Kravitz |
| 6,065,117 A | * | 5/2000 | White ......................... 713/159 |
| 6,108,644 A | * | 8/2000 | Goldschlag et al. ........... 705/69 |
| 6,161,183 A | * | 12/2000 | Saito et al. ................... 713/176 |
| 6,163,771 A | * | 12/2000 | Walker et al. ................. 705/18 |
| 6,226,624 B1 | | 5/2001 | Watson et al. |
| 6,315,193 B1 | * | 11/2001 | Hogan ......................... 235/379 |
| 6,381,587 B1 | * | 4/2002 | Guzelsu ....................... 705/40 |
| 6,456,984 B1 | * | 9/2002 | Demoff et al. ................ 705/40 |
| 6,678,664 B1 | | 1/2004 | Ganesan |
| 2002/0055911 A1 | | 5/2002 | Guerreri |

FOREIGN PATENT DOCUMENTS

| | | | |
|---|---|---|---|
| EP | 0 668 579 A2 | | 8/1995 |
| JP | A-H08-96034 | | 4/1996 |
| JP | A-H10-171909 | | 6/1998 |
| WO | WO 90/01199 | * | 2/1990 |
| WO | WO 93/04425 | | 3/1993 |

OTHER PUBLICATIONS

Ferranti, M., "Businesses bracing for on-line transactions", Network World Canada. DOwnsview: Mar. 27, 1998.*

Japanese Patent Office "Notification of Reasons for Rejection", date of mailing, Feb. 9, 2010.

Canadian Office Action Oct. 19, 2009.

* cited by examiner

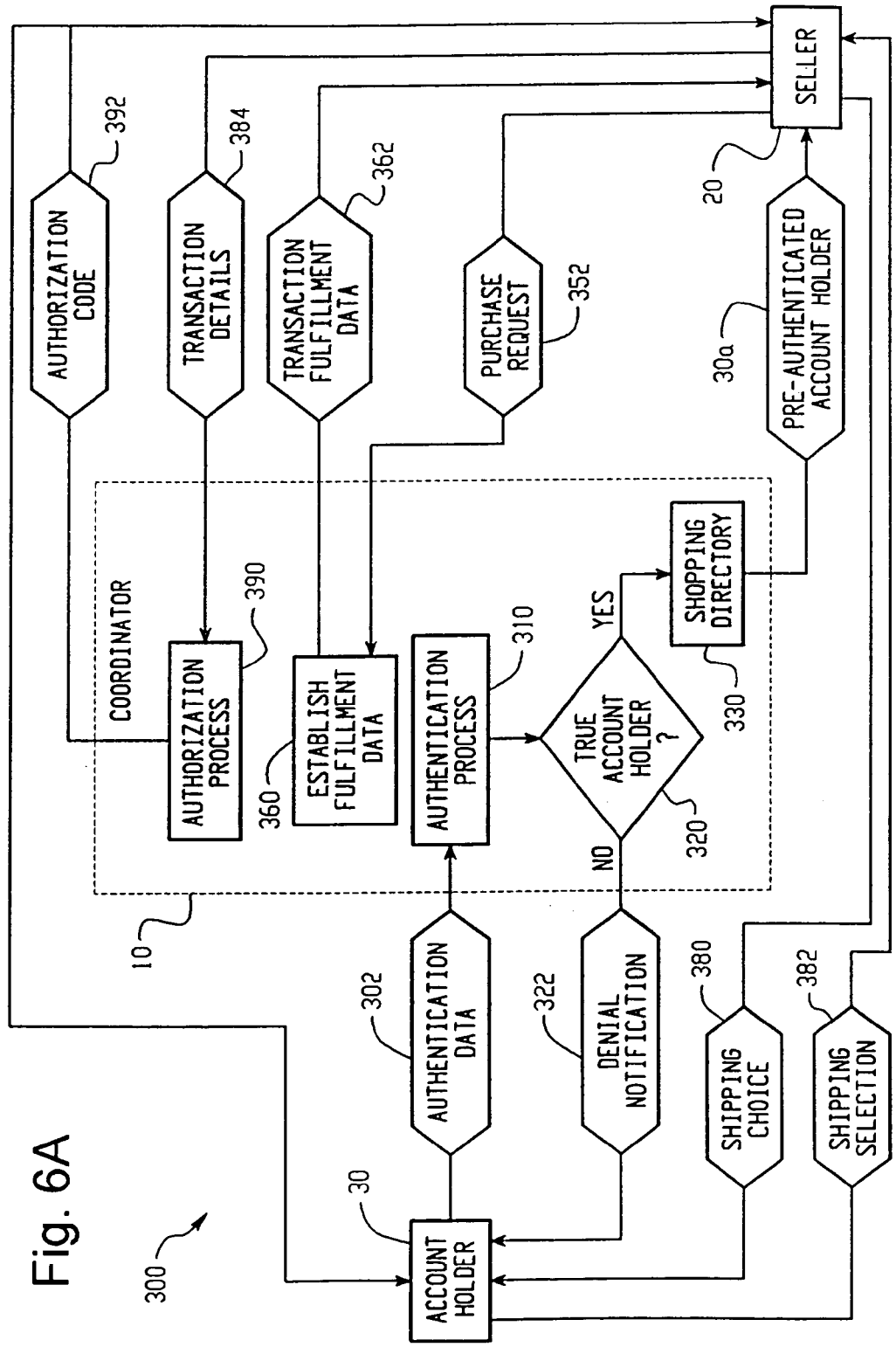

SECURE AND EFFICIENT PAYMENT PROCESSING SYSTEM

This application claims the benefit of provisional application Ser. No. 60/157,304 filed on Oct. 1, 1999, which is incorporated herein by reference in its entirety.

BACKGROUND OF THE INVENTION

The present invention relates to the art of Internet commerce. It finds particular application in conjunction with Internet credit/debit transactions, and will be described with particular reference thereto. However, it is to be appreciated that the present invention is also amenable to other like applications.

Internet commerce, or e-commerce as it is otherwise known, relates to the buying and selling of products and services by buyers and sellers over the Internet or the transactional exchange of information. The convenience of shopping over the Internet has sparked considerable interest in e-commerce on behalf of both buyers and sellers. Internet sales or like transactions have been typically carried out using standard credit/debit cards such as Visa®, MasterCard®, Discover®, American Express®, or the like. However, while widely used for more traditional face-to-face transactions, use of these standard credit/debit cards and their associated processing systems in connection with e-commerce presents certain difficulties.

In particular, for example, standard credit/debit card transactions typically involve a relatively high number of intermediaries that are used in processing the transaction from an initial purchase request, through authentication and authorization, and ultimately to settlement. In addition to the actual buyer and seller, the cast involved in ultimately completing the transaction through to settlement typically entails member banks including a merchant or acquiring bank and an issuing bank. Often, an Internet processor (e.g., Cybercash), member service provider (MSP), or an independent sales organization (ISO) is also involved. Additionally, third party processors, agent banks, and/or deposit banks are commonly employed. As each intermediary charges a bulk, per-transaction, percentage, or other like fee for its role in handling the transaction, the total transaction cost grows with each additional intermediary employed. Consequently, streamlining transaction processing and elimination of intermediaries beneficially holds transaction costs down.

Another issue is buyer confidence and security. The fact that e-commerce transactions are not carried out face-to-face often creates apprehension in a potential buyer regarding transactions. This apprehension is fueled by uncertainty of the reputation or quality of seller with whom they're dealing and the security of their credit/debit card information or other personal information (e.g., address, credit card number, phone number, etc.) typically submitted along with a traditional Internet credit/debit transaction. Additionally, both the credit/debit account holder, sellers, financial institutions are concerned about safeguarding against fraudulent or otherwise unauthorized credit/debit card transactions.

The present invention contemplates a new and improved transaction processing system and technique for carrying out credit/debit transactions over the Internet that overcomes the above-referenced problems and others.

SUMMARY OF THE INVENTION

In accordance with one aspect of the present invention, a method for conducting a commercial transaction carried out over the Internet is provided. The method includes synchronizing a token with a periodically changing non-predictable code, and providing an account holder with the token. The token displays the periodically changing non-predictable code. The method further includes receiving a code communicated by a buyer in the commercial transaction, and comparing the received code with the periodically changing non-predictable code to authenticate the buyer as the account holder when the received code matches the periodically changing non-predictable code.

In accordance with another aspect of the present invention, a method of carrying out commercial transactions is provided. The method includes generating a number of separate periodically changing non-predictable codes, and assigning unique user names to a number of account holders such that each user name is associated with one of the separate periodically changing non-predictable codes. The account holders are provided with tokens and each token is synchronized to generate the same separate periodically changing non-predictable code associated with the unique user name assigned to the account holder being provided the token. Thereafter, codes along with user names communicated by buyers involved in commercial transactions are received and, for each set of received codes and user names, the buyer is authenticated as the account holder having the corresponding user name when the received code matches the periodically changing non-predictable code for the user name communicated.

In accordance with another aspect of the present invention, a method of conducting commercial Internet transactions is provided. The method includes selecting merchants as designated sellers for buyers to perform commercial transactions with, and providing the selected merchants with transaction objects to be installed on their Internet connected servers which are used to perform commercial transactions between the merchants and buyers. Account holders are provided with user names and tokens. The tokens generate periodically changing non-predictable codes associated with the user names of the account holders to which the tokens were provided. The same periodically changing non-predictable codes associated with each user name are remotely generated as well. Sets of information associated with the commercial Internet transactions are received due to buyers accessing the transaction objects of selected merchants. Each set of information includes a pass code and a user name. Each buyer is authenticated as the account holder having the received user name when the received pass code matches the remotely generated periodically changing non-predictable code for that user name.

In accordance with another aspect of the present invention, a method of processing commercial transactions carried out over the Internet between account holders and participating merchants is provided. The method includes receiving a purchase request of a buyer from a participating merchant indicating that the buyer desires to carry out a transaction with the merchant. The transaction includes the buyer purchasing one or more selected items from the merchant. The buyer is authenticated as an account holder and transaction fulfillment data is established. The transaction fulfillment data indicates a delivery destination for the selected items. In turn, the transaction fulfillment data is communicated to the participating merchant, and transaction details from the participating merchant are received. The transaction details include a cost for the selected items. Thereafter, completion of the transaction is authorized and an authorization code established therefor is communicated to the participating merchant.

One advantage of the present invention is that Internet credit/debit transactions are privately, securely, potentially anonymously, and readily carried out.

Another advantage of the present invention is that a high transaction count boosted by increased buyers' confidence in Internet shopping leads to increased sales for sellers.

Another advantage of the present invention is that buyers and sellers are protected from fraudulent or otherwise unauthorized transactions.

Yet another advantage of the present invention is that transaction costs are reduced to the extent that streamlined processing reduces intermediaries that would otherwise contribute to the transaction costs.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIGS. 6A and 6B are flow charts showing an online shopping experience and related processing in accordance with aspects of the present invention with pre-shopping authentication and post-shopping authentication, respectively;

DETAILED DESCRIPTION OF THE PREFERRED EMBODIMENTS

Figure 1:
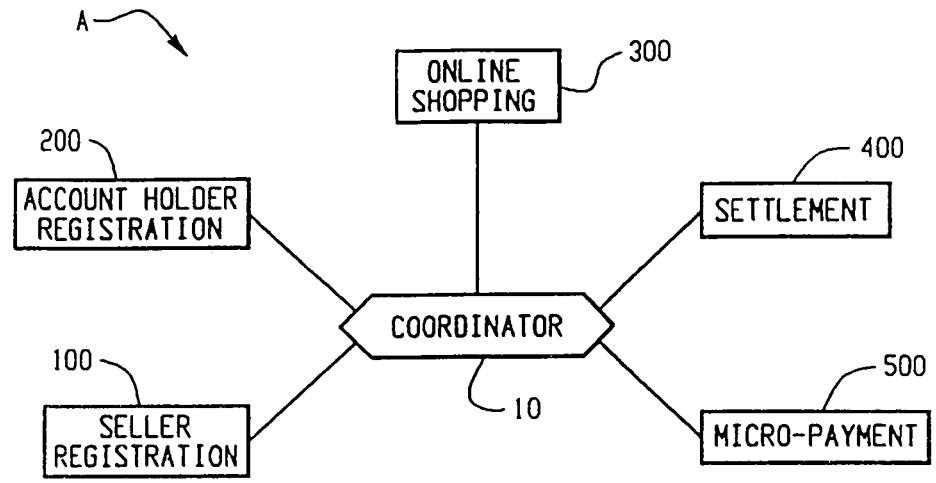
FIG. 1 is a flow chart showing a high level overview of an online credit/debit transaction processing system in accordance with aspects of the present invention.

With reference to FIG. 1, a central transaction coordinator 10 administers a number of different yet inter-dependent processes in a commercial Internet credit/debit transaction processing system A. The processes administered by the coordinator 10 include: (i) a seller registration process 100 wherein merchants or sellers are signed up for participation in the transaction processing system A; (ii) an account holder registration processes 200 wherein buyers or consumers are signed up as account holders for participation in the transaction processing system A; (iii) an online shopping process 300 wherein buyers or consumers engage in online commercial transactions with merchants or sellers; and, (iv) a settlement process 400 wherein completed commercial transactions are confirmed and settlement information forwarded directly to a funding source for billing and payment processing. Optionally, the coordinator also administers a micro-payment process 500 wherein individual small transactions (i.e., transactions involving funds that are less than or small relative to any associated processing fees or costs) are aggregated prior to the submission of settlement information to the funding source. In addition, the coordinator 10 itself optionally acts as the funding source. However, in the interest of simplicity and clarity, in the following description, the discussion is directed to embodiments employing a third party funding source.

Figure 2:
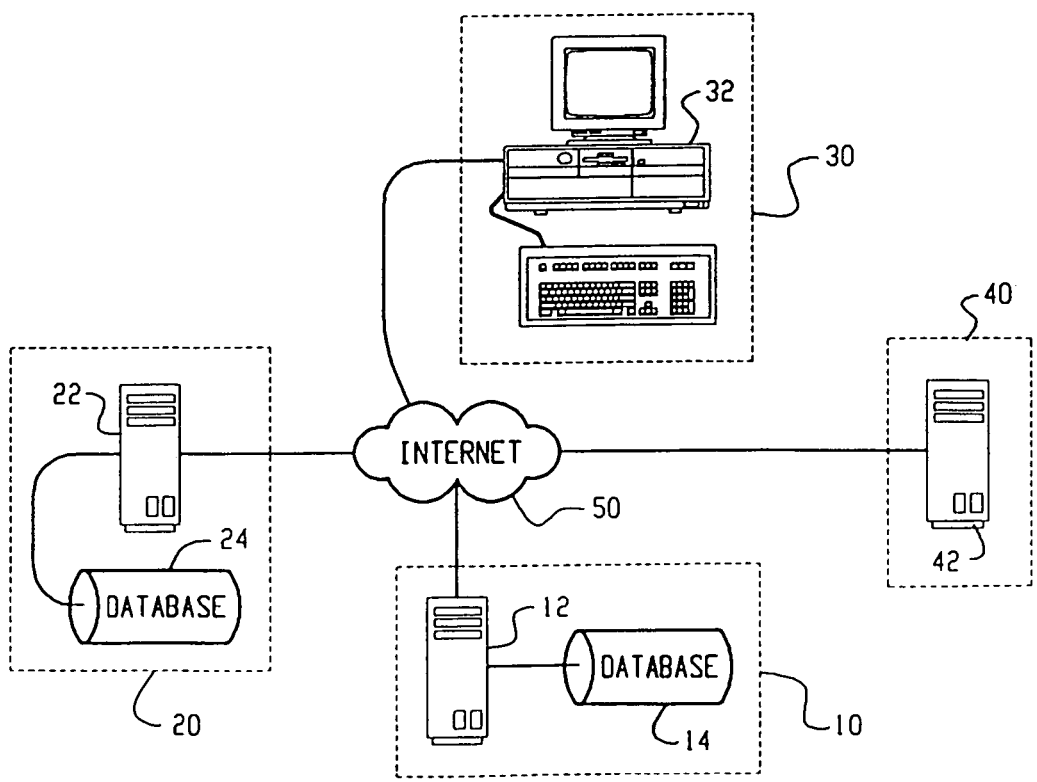
FIG. 2 is a diagrammatic illustration showing Internet connected participants in an online credit/debit transaction processing system in accordance with aspects of the present invention.

With further reference to FIG. 2, in a preferred embodiment, the coordinator 10 maintains a presence on the Internet 50 or other like online network via a server 12. A merchant or seller 20 also maintains a presence on the Internet 50 via a server 22. A buyer or account holder 30 gains access to the seller 20 and/or the coordinator 10 over the Internet 50 using a computer 32 with an appropriate web browser or other like software running thereon. Of course, the transaction processing system A is preferably administered to multiple similarly situated sellers 20 and buyers 30. However, in the interest of simplicity herein, only a one of each are shown in FIG. 2. Additionally, a funding source 40 maintains a presence on the Internet 50 via a server 42. The funding source 40 extends credit for credit accounts or holds deposits for debit accounts created on behalf of account holders participating in the transaction processing system A. Moreover, it is to be appreciated that the security of the transaction processing system A is further enhanced by encrypting, with known encryption techniques, communications relayed or otherwise transmitted over the Internet 50.

Figure 3:
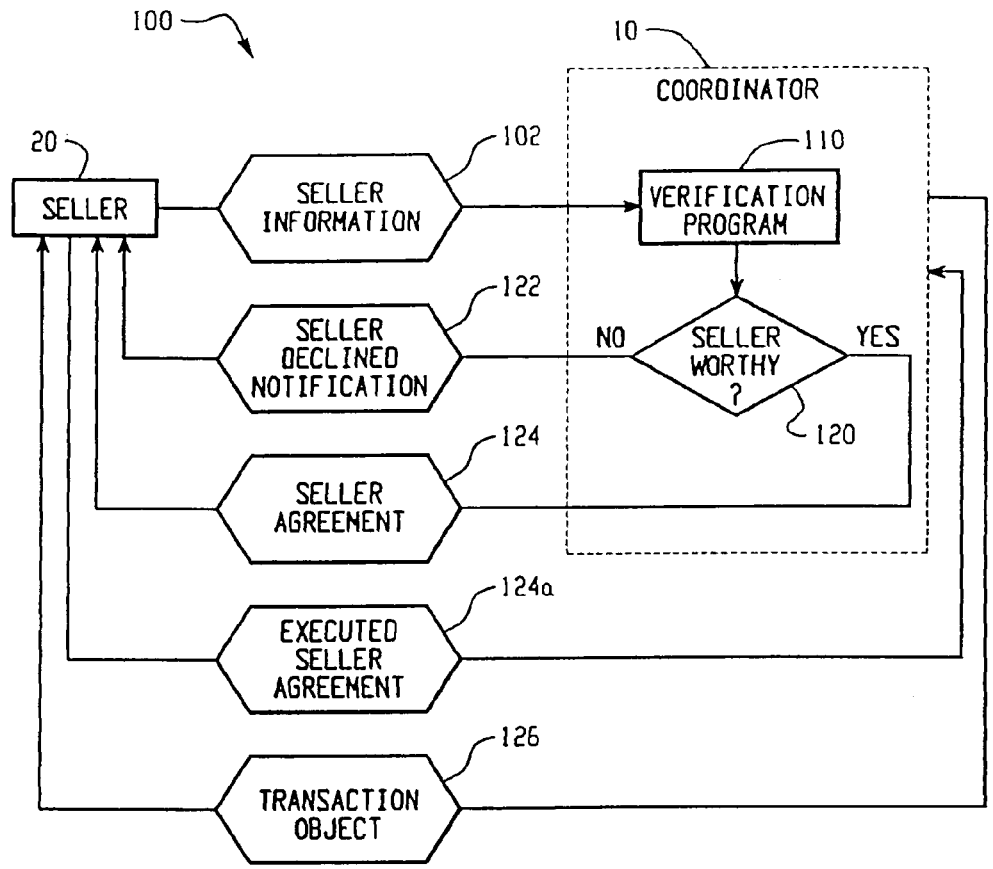
FIG. 3 is a flow chart showing a process for registering sellers for participation in an online credit/debit transaction processing system in accordance with aspects of the present invention.

With further reference to FIG. 3, in the seller registration process 100, an interested merchant or seller 20, preferably doing business on the Internet 50 via their server 22, is registered for participation in the Internet credit/debit transaction processing system A administered by the transaction coordinator 10. The seller registration process 100 begins with the coordinator 10 receiving seller information 102 (e.g., financial information, physical address, category of good or services sold, Internet address, e-mail address, etc.) from the seller 20. Online or over the Internet 50, this is optionally accomplished by receiving the seller information 102, perhaps encrypted, via the coordinator's server 12. Using the received seller information 102, the worthiness of the seller 20 for participation in the Internet credit/debit transaction processing system A is evaluated.

Preferably, a verification program 110 is applied to evaluate the seller 20 based on the seller information 102 received by the coordinator 10. The verification program 110, optionally running on the coordinator's server 12, is carried out using a predetermined or otherwise selected algorithm that acts on quantifiable values representing the seller information 102. In this manner, the seller's credit worthiness is determined and/or the seller's reliability and reputation for customer service and sound business practice is determined using objective, subjective, or a combination of objective and subjective criteria. Accordingly, the coordinator 10 ensures that the seller 20 is able to meet potential obligations. Moreover, account holders 30 participating in the transaction processing system A are reassured that they are patronizing high quality merchants or sellers with strong customer satisfaction guarantees.

In response to the evaluation, at decision step 120, the coordinator 10 decides whether or not the interested seller 20 is declined or approved for participation. If declined, a notification 122 is sent to the interested seller and the seller registration process 100 ends. If approved, the coordinator 10 forwards a seller agreement 124 to the seller 20. Online or over the Internet 50, the seller agreement 124 is optionally forwarded from the coordinator's server 12 to the seller's server 22. The seller agreement 124 outlines the rights and responsibilities or duties of the seller 20 with respect to their participation in the credit/debit transaction processing system A. After the seller 20 physically signs, electronically signs, or otherwise executes the seller agreement 124, it is returned to the coordinator 10, perhaps through the coordinator's server 12. Upon receipt of the executed seller agreement 124a, the coordinator 10 creates and maintains a record of the seller information 102, the seller's approval, the seller agreement 124, etc. Preferably, the record is electronically created and maintained in a coordinator's database 14 which is accessible by the coordinator 10, and optionally, the funding source 40.

Preferably, upon acceptance of the executed seller agreement 124a, the coordinator 10 forwards to the seller 20 a transaction object 126 which places a link on the seller's online shopping check-out page or otherwise runs on the seller's server 22. The object or link operates to integrate the credit/debit transaction processing system A into, or otherwise allows the processing system A to be accessed through, the seller's online shopping system or Internet shopping web page or pages. Optionally, the coordinator 10 installs the object on the seller's server 22. Accordingly, account holders 30 shopping online or over the Internet 50 can access the object (e.g., by clicking the link on seller's check-out web page) and be automatically routed to the coordinator 10 for authentication and/or authorization. In this manner then, merchants or sellers 20 become registered for participation in the transaction processing system A.

Figure 4:
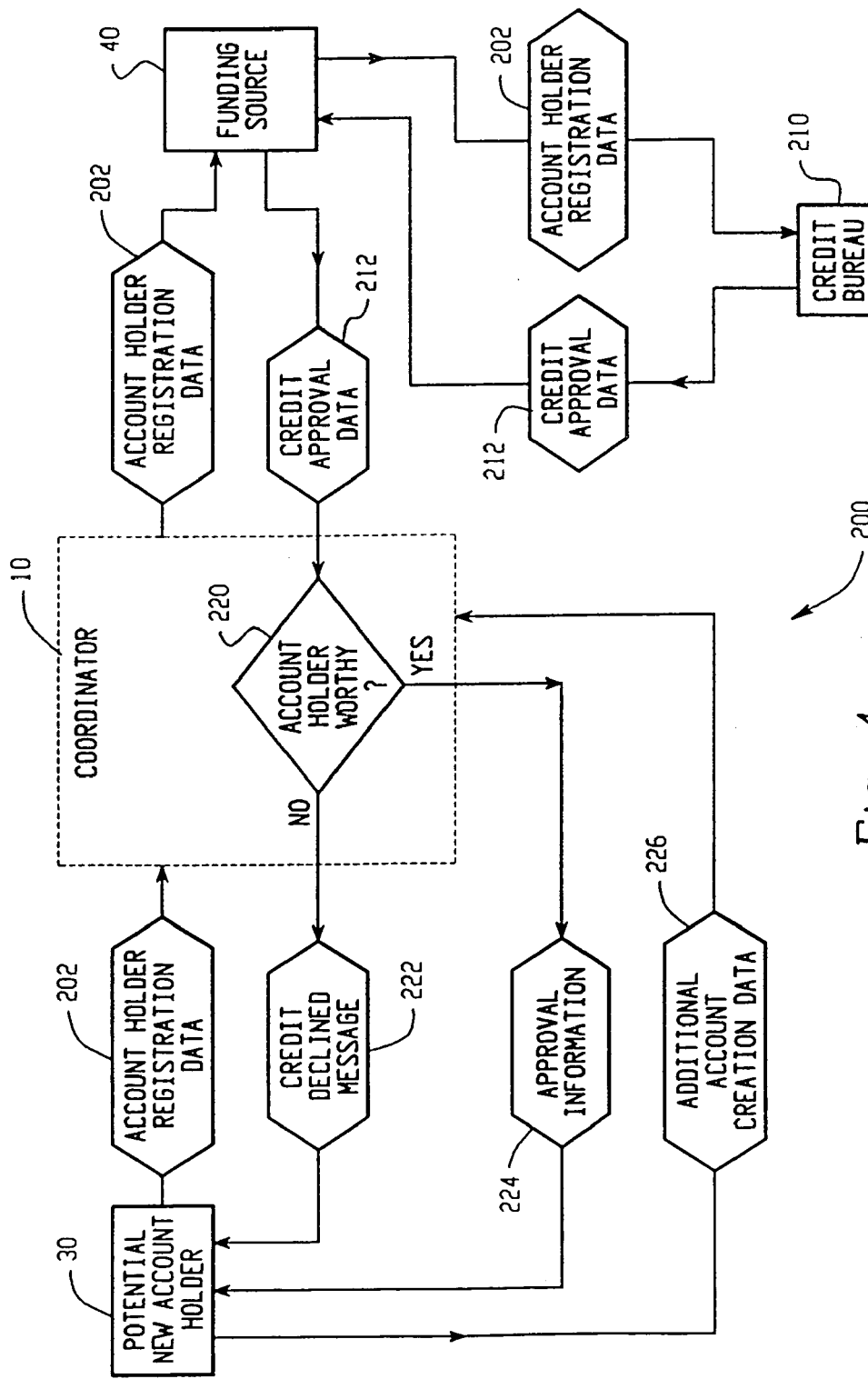
FIG. 4 is a flow chart showing a process for registering account holders for participation in an online credit/debit transaction processing system in accordance with aspects of the present invention.

With further reference to FIG. 4, in the account holder registration process 200, registration of a buyer or consumer to become an account holder 30 begins with a visit by the buyer to the coordinator 10. Optionally, over the Internet, the interested buyer or consumer, using an appropriate web browser, accesses an account holder registration page which is made available via the coordinator's sever 12. As the account holder registration process 200 continues, account holder registration data 202 (e.g., name, address, length at residence, own or rent residence, e-mail address, home phone number, work phone number, social security number, date of birth, mother's maiden name, employer, income, employment status, etc.) is collected or otherwise obtained by the coordinator 10 from the buyer or the potential new account holder 30 who is making application for participation in the credit/debit transaction processing system A. Prior to accepting the consumer or buyer as a new account holder 30, their credit worthiness is evaluated.

Preferably, the coordinator 10 passes relevant account holder registration data 202 to the funding source 40. The relevant account holder registration data 202 is then analyzed for credit worthiness. Optionally, the data is analyzed by the funding source's own credit approval system, or it is passed on to one or more credit bureaus 210 for analysis. The analysis preferably includes the application of known credit approval techniques and algorithms which determine credit worthiness. Ultimately, credit approval data 212 (e.g., approval or denial, amount of credit, risk, etc.) is routed back to the coordinator 10 through the funding source 40.

Upon receipt of the credit approval data 212, the coordinator 10 decides, at decision step 220, if the potential new account holder 30 is worthy of participation in the transaction processing system A. Then the coordinator 10 notifies the potential new account holder 30 of the credit decision. That is to say, if credit is declined, a credit-declined message 222 is communicated to the potential account holder 30. On the other hand, if credit is approved, approval information 224 (e.g., the annual percentage rate, credit limit, etc.) is communicated to the potential new account holder 30 for acceptance. In a preferred embodiment, the credit approval or denial is communicated to an online potential new account holder 30 accessing the coordinator over the Internet 50 by displaying an appropriate web page from the coordinator's server 12 to the potential new account holder 30. Alternately, the credit approval or denial is communicated via e-mail to the potential new account holder's designated e-mail address previously obtained along with the account holder registration data 202. In any event, optionally, at this time, the potential new account holder 30 is advanced an initial, albeit preferably limited, line of credit and temporary password enabling him to immediately shop online at a registered seller 20 using the credit/debit transaction processing system A administered by the transaction coordinator 10.

If approved and account holder status is still desired, along with an indication of acceptance, the account holder 30 supplies the coordinator 10 with additional account creation data 226 including a secret personal identification number (PIN) and the answers to a number of designated or otherwise selected security questions. The security questions are preferably questions to which only the account holder 30 is likely to know the answers (e.g., the account holder's first car, the name of the account holder's dog, etc.). Upon acceptance, the coordinator 10 creates and maintains a record for the account holder 30, preferably in electronic format on the coordinator's database 14. The account holder record includes the account holder registration data 202, credit approval data 212, approval information 224, acceptance, and additional account creation data 226. In addition, a corresponding credit account is created with the funding source 40.

The account holder record may also contain information or data relating to account privileges. In a preferred embodiment the account holder 30 has the option to customize or modify their account privileges. The account privileges are customized by the account holder 30, for example, by accessing the coordinator's server 12 over the Internet 50. For security purposes, the account holder is optionally authenticate as such, preferably, using the below described authentication procedure, prior to permitting any account modifications. However, at initial account creation, the below described authentication procedure is not employed. The account privileges are optionally set by the account holder 30 to limit the use of the account holder's account in the transaction processing system A. That is to say, the set account privileges may restrict the account so that purchases thereon are not authorized for specified participating merchants or sellers 20, so that automatically recurring transactions carried out absent the direct participation of the account holder 30 are not authorized, so that single purchases over a certain price limit are not authorized, so that aggregate per day purchases are limited to a desired level, and the like.

Figure 5:
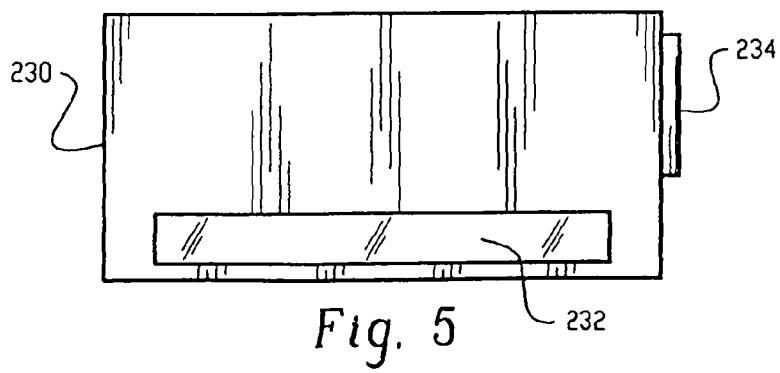
FIG. 5 is a diagrammatic illustration showing a credit token for use in connection with an online credit/debit transaction processing system in accordance with aspects of the present invention.

At the initial account creation, the coordinator 10 also assigns the account holder 30 an associated user identity which is unique to the account holder 30 and becomes part of the account holder's record (e.g., a self-selected user name, or an otherwise assigned alpha-numeric designation), and optionally, a corresponding credit token 230 (see FIG. 5) is issued to the account holder 30. The credit token 230 periodically (e.g., every 60 seconds) generates a non-predictable alpha-numeric code (preferably 6 characters in length) using a predetermined or otherwise selected algorithm. The algorithm used in generating the periodically changing non-predictable alpha-numeric code is preferably a function of an initial seed value and a time value obtained from an internal clock. The credit token 230 renders the code on an incorporated liquid crystal display (LCD) readout 232 or other like human-viewable display. Additionally, the credit token 230 provides an indicator as to the duration of the displayed code's validity (i.e., the time remaining before generation of the next non-predictable code). Accordingly, every period, the credit token 230 generates a dynamically changing non-predictable alpha-numeric code which (with the exception of the coordinator 10) is only available to the account holder 30 in possession of the credit token 230.

For each unique user identity, the coordinator 10 also independently generates a periodically changing non-predictable alpha-numeric code which is synchronized with and the same as the token generated code for the corresponding account holder 30 having that user identity. The independently generated and synchronized code is maintained with the corresponding account holder's record. Preferably, the coordinator 10 generates the synchronized code by running software which uses (i) an algorithm and (ii) an initial seed value which are both, identical to that used by the corresponding token 230 and (iii) a time value from a clock which is synchronized with the token's internal clock. In this manner then, the alpha-numeric code from an account holder's credit token 230 and the independently generated alpha-numeric code maintained with the account holder's record are the same at any given time.

In particular, systems for independently producing and comparing or otherwise verifying synchronized dynamically changing non-predictable codes are disclosed in U.S. Pat. Nos. 5,168,520 and 4,720,860 to Weiss, both incorporated herein by reference, in their entirety. In one preferred embodiment, at least one of the above referenced systems is employed herein.

Alternately, a potential new account holder 30 may contact the funding source 40 directly for registration to participate in the transaction processing system A. In this case, the funding source carries out substantially the same account holder registration process 200 and forwards the account holder record to the coordinator 10.

Figure 6B:
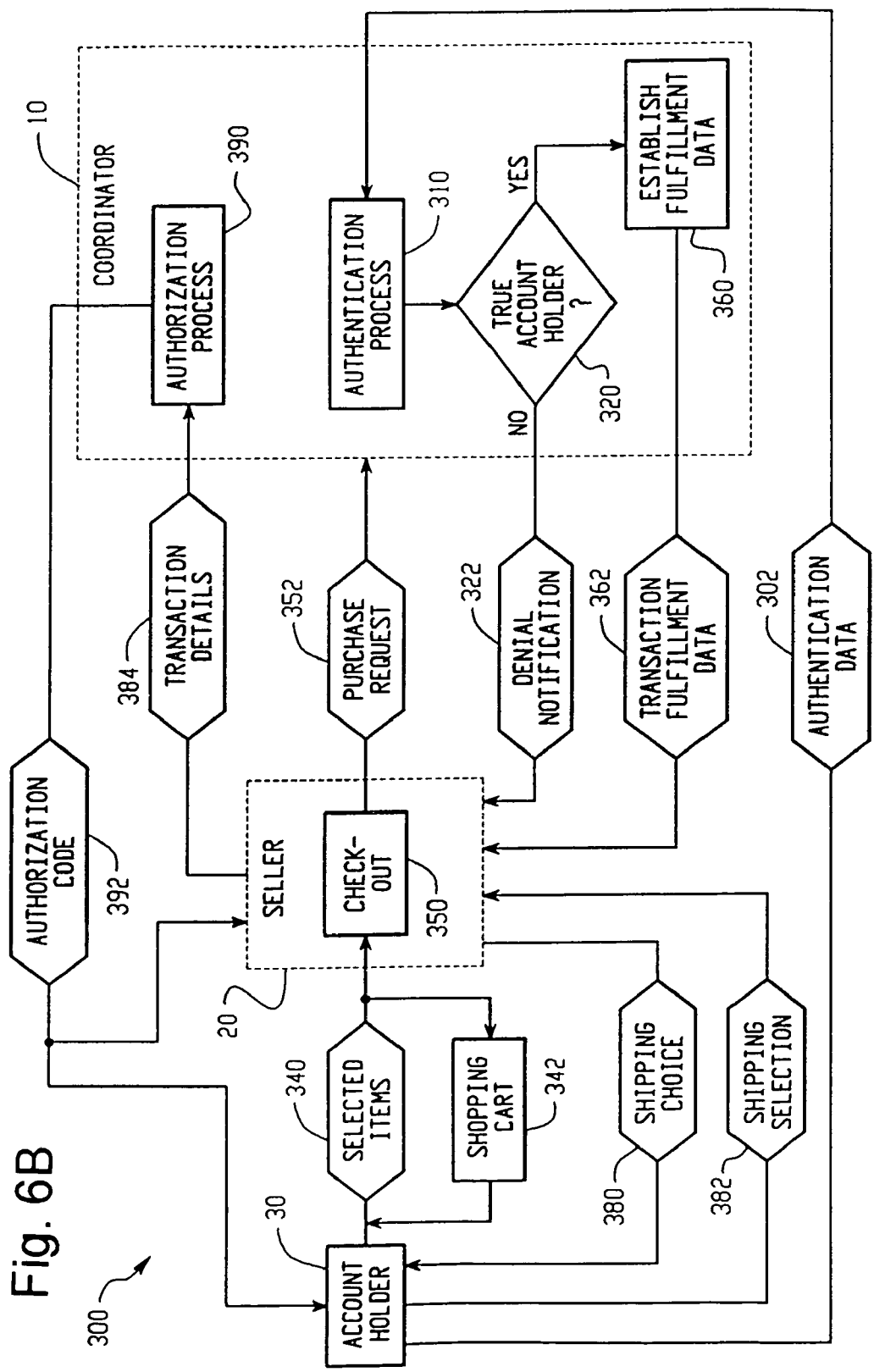

With further reference to FIGS. 6A and 6B, in a preferred embodiment, an online or Internet shopping experience or process 300 begins with an account holder 30 contacting the coordinator 10 (e.g., accessing the coordinator's online or Internet shopping portal using an appropriate web browser) or otherwise requesting a web page from or linking to the coordinator's server 12. At this juncture, the account holder 30 is given the option to pre-authenticate their identity prior to engaging in any particular commercial transactions with the participating merchants or sellers. Authentication is preferably accomplished by the coordinator 10 collecting from the account holder 30 authentication data 302 having one or more elements including the account holder's user identity, PIN, and/or token generated alpha-numeric code. Optionally, one or more elements of the authentication data 302 are entered manually by the account holder 30. Alternately, one or more of the elements are stored or otherwise maintained on the computer 32 being employed by the account holder 30 to access the coordinator's server 12 such that they are automatically entered where appropriate. For example, with regard to the non-predictable alpha-numeric code, rather than having a separate physical token 230, the "token" is optionally an object running on the account holder's computer 32 which enters or displays the alpha-numeric code when accessed. Alternately, a separate physical token 230 optionally includes an interface 234 (see FIG. 5) through which it is connected to the account holder's computer such that the token generated alpha-numeric code is read directly from the token 230 without manual entry.

In any event, the coordinator 10 runs the authentication data 302 through an authentication process 310 which compares the entered or otherwise collected authentication data 302 with the corresponding data in the account holder record having the same user identity as that included with the authentication data 302. The coordinator 10 then determines, at decision step 320, whether or not the alleged account holder 30 is an authentic account holder previously registered using the account holder registration process 200. Of course, where the user identity included with the authentication data 302 does not have a corresponding account holder record or is otherwise invalid, the authentication is denied or fails and the alleged account holder 30 and/or involved seller 20 is sent a denial notification 322. Additionally, where the authentication data 302 and corresponding data in the account holder record having the same user identity do not match, the authentication is also denied or fails and the alleged account holder 30 and/or involved seller 20 is again sent the denial notification 322. Only when there is an identical match between the authentication data 302 and the account holder record does the accessing account holder 30 become authenticated and/or positively identified as the true account holder having the corresponding user identity.

In one preferred embodiment, the authentication or positive identification is carried out, e.g., as described in the previously referenced U.S. Pat. Nos. 5,168,520 and 4,720,860. Alternately, other authentication methods or procedures may be employed that positively identify the account holder 30, e.g., challenge response, quick log mode, other one or more factor authentication methods (such as a static user name and password or PIN), smart cards, biometric authentication (such as fingerprint recognition or retinal scanners), etc. These authentication techniques ensure that the coordinator 10 is able to independently make a positive identification of the account holders 30.

With particular reference now to FIG. 6A, next, the account holder 30 requests, or the coordinator's server 12 otherwise displays, a web page or the like with a shopping directory 330 listing participating merchants or sellers 20 that are registered with the credit/debit transaction processing system A system administered by the coordinator 10. The account holder 30 is then free to select the participating seller 20 of his choice and shop as a pre-authenticated account holder 30a.

With particular reference now to FIG. 6B, alternately, the account holder 30 accesses the seller's online store or Internet shopping site directly from the seller's server 22 and shopping is carried out absent pre-authentication. At the seller's site, the buyer or account holder 30 selects items 340 of goods and/or services which are desired for purchasing. Preferably, these goods or services are then placed into a virtual shopping cart 342. If more shopping is desired, the process loops back to product selection and other like shopping web pages made available from the seller's server 22. On the other hand, if shopping is complete, the process continues on to check-out 350. When the buyer or account holder 30 accesses the transaction object 126 or link previously established on the participating merchant's or seller's check-out page 350, the buyer or account holder 30 is routed to the coordinator 10 along with a purchase request 352 indicating the buyer desires to carry out a commercial transaction with the referring participating seller 20. Preferably, the transaction in question includes the buyer or account holder purchasing one or more selected items from the participating merchant or seller 20.

If not pre-authenticated, when the buyer or account holder 30 is routed to the coordinator 10, they are presented with an authentication page from the coordinator's server 12. At this point, using the same authentication procedure 310 as used in pre-authentication, the buyer is authenticating and/or positively identified as an account holder 30 having a unique user identity. If pre-authenticated, the account holder 30 bypasses this authentication step.

In any event, provided authentication is complete and successful, the coordinator 10, at process step 360, establishes transaction fulfillment data 362. The transaction fulfillment data 362 identifies information which is used by the participating seller 20 to fulfill their obligation(s) to the account holder 30 for the commercial transaction in which they are currently engaged. For example, the transaction fulfillment data 362 preferably includes a delivery destination for the items selected for purchase in the transaction. For physical goods, the delivery destination may be a shipping address, and for downloaded content, downloaded software, digital goods or services, and other like items, the delivery destination may be an e-mail address or the account holder's networked computer 32.

Figure 6C:
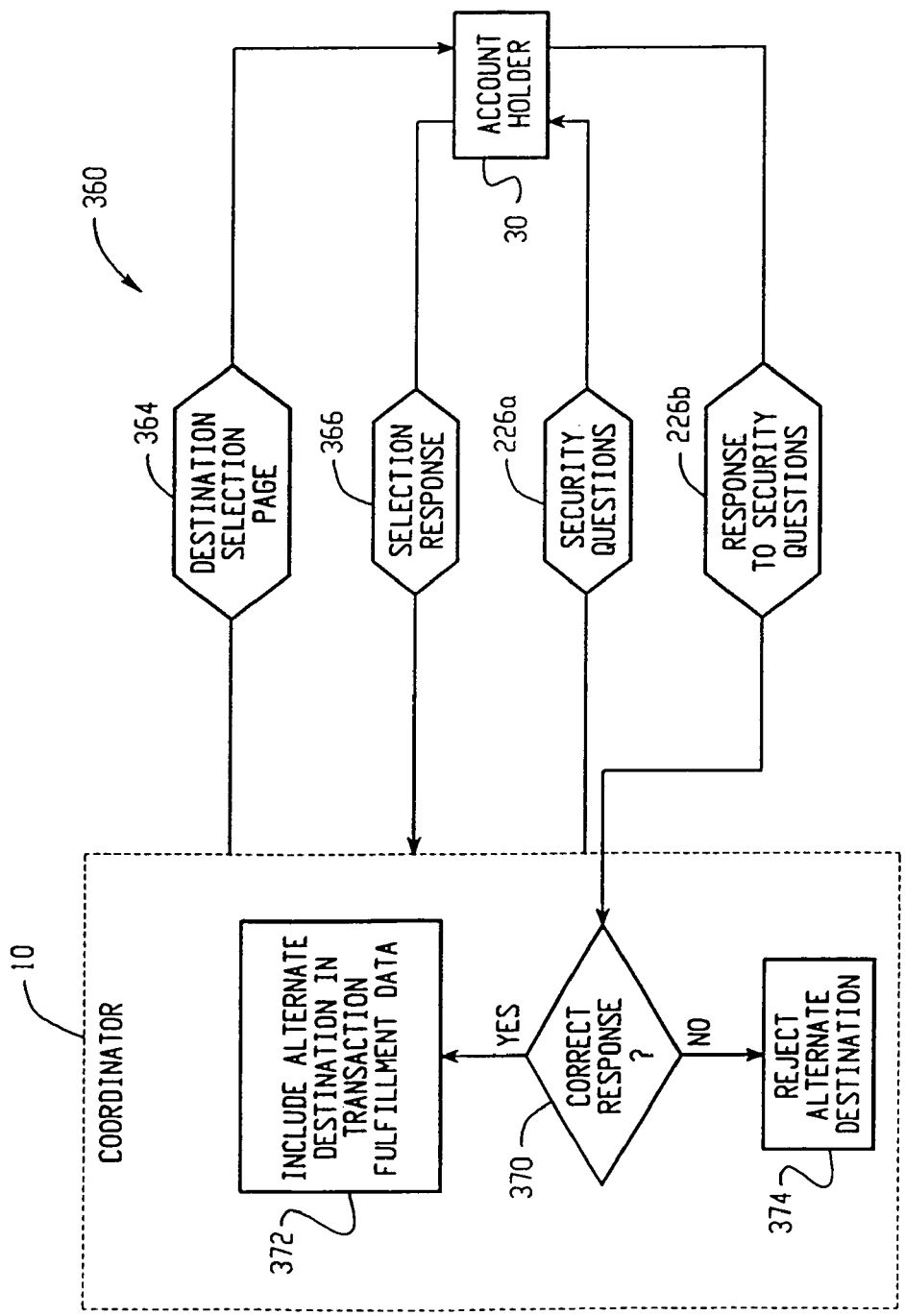
FIG. 6C is a flow chart showing implementation of additional security measures invoked by certain delivery destination conditions which are selected in connection with an online credit/debit transaction processing system in accordance with aspects of the present invention.

With further reference to FIG. 6C, in a preferred embodiment, previously designated (e.g., at account creation) default delivery destinations for the various types of goods or services are maintained in the account holder's record. As a rule, the coordinator 10 uses these default designations in establishing the transaction fulfillment data 362. However, at a destination selection web page 364 presented to the account holder 30 by the coordinator 10, the account holder 30 may optionally designate, via a selection response 366, an alternate destination as the delivery destination.

In a preferred embodiment, if the alternate destination differs from the default destination or if the destination is a direct download to the buyer's or account holder's computer 32, an additional security precaution is invoked. More specifically, the coordinator 10 transmits one or more of the previously answered security questions 226a (i.e., the security questions to which the account holder 30 originally provided answers in connection with the submitted additional account creation data 226) to the buyer or account holder 30. The coordinator 10 then receives from the buyer or account holder 30 an answer 226b in response to each security question. The coordinator 10 then determines, at decision step 370, if the answers 226b are correct. As shown at process step 372, only when the newly received responses match the previously given answers in the account holder's record is the alternate or download destination included in the established transaction fulfillment data 362. Otherwise, as shown at process step 374, the alternate or download destination is rejected. Optionally, approved alternate destinations may also be stored in an account holder address book maintained with the account holder's record for convenient future access and use by the account holder 30.

Optionally, the delivery destination is a non-identifying destination such that anonymity of the account holder 30 is maintained with respect to the participating merchant or seller 20. For example, the non-identifying destination may be a post office box, or other neutral third party from which delivered goods are obtained by the account holder 30.

Regardless of the delivery destination, once established, the transaction fulfillment data 362 is communicated by the coordinator 10, preferably online or over the Internet 50, to the participating seller 20, and the account holder 30 is routed back the participating seller 20 where they are optionally presented a shipping choice 380 including choice of shipping carrier (e.g., regular U.S. mail, Federal Express, UPS, etc.) and/or preferred shipping time (e.g., 1 month, 1 week, or next day delivery).

After the account holder 30 has made their selection 382, if any, with regard to shipping carrier and/or preferred shipping time, the transaction details 384 are transmitted from the seller 20 to the coordinator 10 where they are received for authorization processing 390. The transaction details 384 preferably include the total cost (with tax and shipping) for the selected items being purchased in the transaction. Additionally, the transaction details 384 identify the participating merchant or seller 20 and account holder 30 engaged in the transaction. Authorization is based upon the account holder's credit account having an amount of available credit sufficient to cover the total cost of the transaction. Alternately, the account is optionally a debit account such that authorization is based upon the debit account having a sufficient amount of funds on deposit to cover the total cost of the transaction. In either case, when a sufficient amount of funds or credit is available to cover the total cost of the transaction, completion of the transaction is authorized, if not authorization is denied.

Optionally, the status of the account holder's account (credit or debit) is maintained along with the account holder's record in the coordinator's database 14 such that the coordinator 10 may directly authorize transactions. Alternately, the transaction details 384 are passed along to the fund source which then authorizes the transactions. In either case, upon determining authorization (in the affirmative or in the negative), a corresponding authorization code 392 is established for the transaction. Preferably, the authorization code 392 along with the authorization result and the corresponding transaction details 384 are maintained in a transaction record, optionally, stored electronically in the coordinator's database 14. Additionally, an indication of the authorization outcome and the authorization code 392 are communicated to the participating merchant or seller 20 and account hold 30 which then act accordingly.

Figure 7:
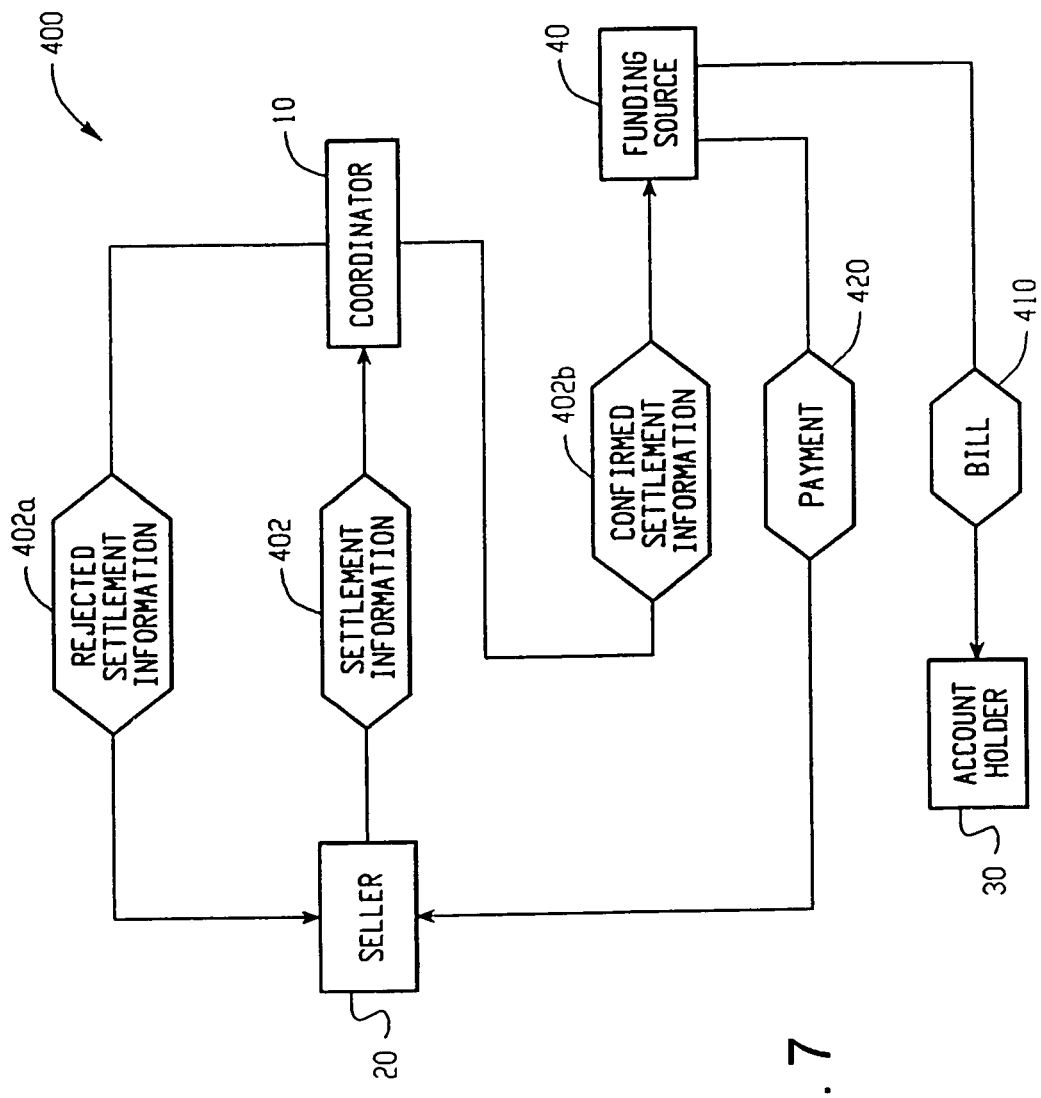
FIG. 7 is a flow chart showing a settlement process of an online credit/debit transaction processing system in accordance with aspects of the present invention; and, FIG. 8 is a flow chart showing a micro-payment processing application of an online credit/debit transaction processing system in accordance with aspects of the present invention.

With further reference to FIG. 7, the settlement process 400 for completed commercial transactions begins with the coordinator 10 collecting or otherwise obtaining settlement information 402 from the seller 30. Preferably, the settlement process 400 occurs periodically, e.g., daily, weekly, etc. Alternately, the settlement information 402 is obtained by the seller 20 routing settlement information 402 to the coordinator 10 or by the coordinator 10 automatically extracting settlement information 402 from the seller 20. For example, with regard to the automatic extraction of settlement information, when a seller's delivery process is executed thereby delivering purchased goods or services to the account holder 30, a seller's inventory database 24 (see FIG. 2) or other such seller database is accordingly updated to indicate delivery and completion of the particular transaction. In the settlement procedure 400 then, settlement information 402 corresponding to those transactions indicated in the seller's database 24 as having been completed is automatically retrieved by the coordinator 10 from the seller's database 24.

The settlement information 402 indicates that the seller 20 has fulfilled his obligations to an account holder in connection with a particular authorized commercial transaction. The obtained settlement information 402 preferably includes the authorization code 392 and the corresponding transaction details 384 for the transaction in question. The coordinator 10 then matches the settlement information 402 to the corresponding transaction record having the same authorization code 392 to confirm or otherwise validate and approve settlement when the transaction details 384 in the settlement information 402 are substantially the same as the transaction details 384 in the transaction record. In particular, the total cost from the transaction details 384 reported in the settlement information 402 is optionally permitted to vary within a given tolerance from the total cost contained in the transaction details 384 of the transaction record. In the cases where there is an insufficient match, rejected settlement information 402*a* is returned to the seller 20.

In a preferred embodiment, periodically (e.g., at the end of each day), the coordinator 10 communicates confirmed settlement information 402*b* directly to the funding source 40, preferably over the Internet 50 or other online network. In turn, the funding source 40 acts accordingly on the confirmed settlement information 402*b*, e.g., sending bills 410 to the appropriate account holders 30 and reimbursing the appropriate merchants or sellers 20 with payment 420 using known billing and payment processing procedures and methods. As the settlement information 402 has already been confirmed by the coordinator 10, optionally, the funding source 40 does not employ independent confirmation of the settlement information 402 and thus may act on the confirmed settlement information 402*b* more readily without additional procedures for validating it.

In this manner, transactions conducted in the transaction processing system A are streamlined as compared to traditional transaction processing systems. In the traditional system, buyers or account holders make purchases using a traditional credit card. The credit card number, expiration date, and accompanying personal information is then forwarded to numerous different intermediaries in an attempt to positively identify and/or authenticate the buyer as the credit card owner. Still further intermediaries are often employed to then authorize a particular transaction and the information is again routed to these additional intermediaries. As a result this system is inherently inefficient. In the transaction processing system A described herein, by providing positive user identification and/or authentication at check-out through the coordinator 10 and by integrating the authentication and authorization procedures 310 and 390, respectively, with the coordinator 10, desirable efficiencies are gained insomuch as the inefficient merchant banking system and the numerous intermediaries are avoided on both the purchase side and the settlement side.

Figure 8:
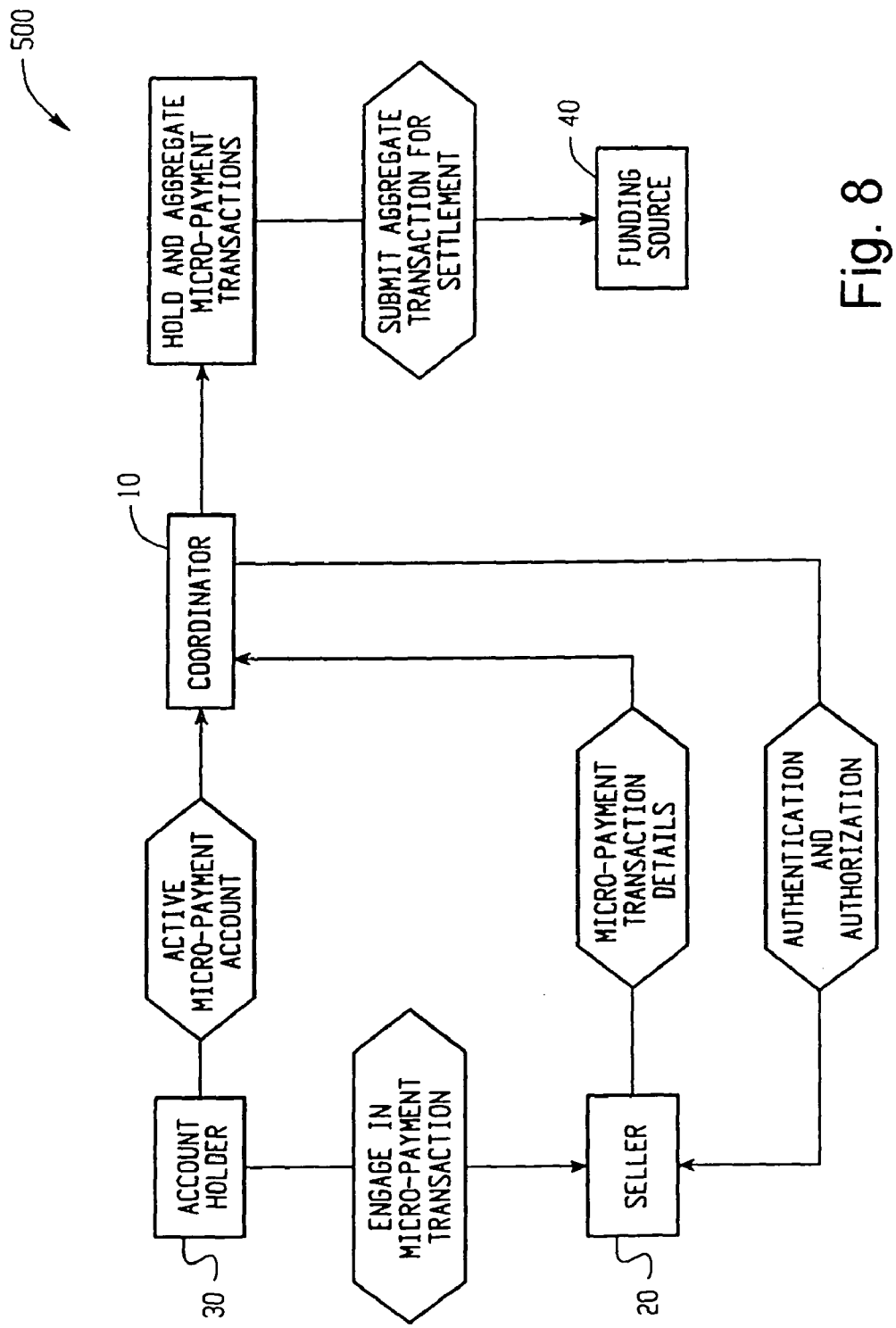

With further reference to FIG. 8, in a preferred embodiment, an account holder 30 is given the option to activate a micro-payment account, for example, by charging their micro-payment account with a minimum predetermined amount (e.g., $25). Once the micro-payment account is activated, the account holder 30 can use the micro-payment account at a seller's site to purchase goods and services involving small transaction amounts. The authentication process and authorization remains the same as that used for standard transactions. However, the individual micro-payment transactions are held and aggregated by the coordinator 10 prior to being sent to the funding source 40 for settlement. As with the standard transactions, the micro-payment transaction details are maintained by the coordinator 10 for future use in settlement. Based on predetermined or otherwise selected criteria, the cumulative settlement information is sent from coordinator 10 directly to the funding source 40 when the cumulative transaction amount is sufficiently greater than applicable processing fees or costs. Accordingly, this process allows the coordinator 10 to aggregate micro-payment transactions to limit the number of settlement transactions thus reducing the per-transaction processing fees or costs. Upon depletion of the account holder's micro-payment account, the account holder 30 is instructed to re-charge their micro-payment account, preferably, in set monetary increments, e.g., $25, $50, or the like. The micro-payment account may be considered depleted whenever the balance is insufficient to cover a micro-payment transaction.

In addition to administering the transaction processing system A for registered participants, the coordinator 10 also optionally opens the system up to outside third parties such as private label credit card issuers. In this manner, the transaction processing system A acts as a universal platform from which the private label cards can be used to conduct commercial transactions outside the issuer's store.

The invention has been described with reference to the preferred embodiments. Obviously, modifications and alterations will occur to others upon reading and understanding the preceding detailed description. For example, the transaction processing system A is equally applicable to and adept at handling face-to-face transactions, telephone transactions, and the like, as it is at handling Internet transactions. It is intended that the invention be construed as including all such modifications and alterations insofar as they come within the scope of the appended claims or the equivalents thereof.

Having thus described the preferred embodiments, the invention is now claimed to be:

1. A method of processing a transaction carried out over a network between a financial account holder and a participating entity, said method comprising the steps of:
   (a) receiving a purchase request of a buyer from the participating entity indicating that the buyer desires to carry out a transaction with the entity, said transaction including the buyer purchasing one or more selected items;
   (b) authenticating the buyer as the financial account holder;
   (c) establishing transaction fulfillment data, said transaction fulfillment data indicating a delivery destination for the selected items, wherein establishing the transaction fulfillment data includes using a previously obtained destination as the delivery destination for the selected items when an alternate destination is not obtained;
   (d) communicating the transaction fulfillment data to the participating entity;
   (e) receiving transaction details from the participating entity, said transaction details including a cost for the selected items;
   (f) authorizing, via a processor, completion of the transaction and establishing an authorization code therefor; and,
   (g) communicating the authorization code for the transaction to the participating entity.

2. The method according to claim 1, wherein establishing the fulfillment data further includes:
   obtaining an alternate destination from the buyer, said alternate destination being different from the previously obtained destination;
   transmitting a security question to the buyer;
   receiving a response to the security question from the buyer; and,
   using the alternate destination as the delivery destination for the selected items when the response to the security question is accurate.

3. The method according to claim 1, wherein the transactions are at least partially carried out over a public network.

4. A method of processing transactions carried out over a network between account holders and participating entities, said method comprising the steps of:

(a) obtaining restriction instructions from account holders;

(b) receiving a purchase request of a buyer from a participating entity indicating that the buyer desires to carry out a transaction with the entity, said transaction including the buyer purchasing one or more selected items;

(c) authenticating the buyer as an account holder;

(d) receiving transaction details from the participating entity, said transaction details including one or more terms for the purchase;

(e) authorizing completion of the transaction and establishing an authorization code therefor; and, (f) communicating the authorization code for the transaction to the participating entity.

5. The method according to claim 4, wherein said restriction instructions block authorizing the completion of transactions with participating entities identified in the restriction instructions.

6. The method according to claim 4, wherein said restriction instructions block authorizing the completion of recurring transactions which are not separately participated in by the account holder from whom the restriction instructions were obtained.

7. The method according to claim 4, wherein authorizing completion of the transaction includes comparing a cost of the selected items to a threshold such that if the cost is less than or equal to the threshold authorization is given and if the cost if greater than the threshold authorization is denied.

8. The method according to claim 7, wherein the threshold represents an amount selected from a group consisting of funds on deposit for the account holder, credit available to the account holder, and a value set via the obtained restriction instructions.

9. The method according to claim 4, wherein the transactions are at least partially carried out over a public network.

10. A method of processing transactions carried out over a network between account holders and participating entities, said method comprising the steps of:

(a) receiving a purchase request of a buyer from a participating entity indicating that the buyer desires to carry out a transaction with the entity, said transaction including the buyer purchasing one or more selected items;

(b) authenticating the buyer as an account holder;

(c) receiving transaction details from the participating entity, said transaction details including a cost for the purchase;

(d) authorizing, via a processor, completion of the transaction and establishing an authorization code therefor, wherein authorizing completion of the transaction and establishing an authorization code therefor includes:

transmitting the transaction details of the authenticated account holder directly to a funding source which determines if the account holder has one of sufficient funds on deposit with the funding source or sufficient credit available through the funding source to cover the cost of the purchase; and, receiving the authorization code from the funding source;

and, (e) communicating the authorization code for the transaction to the participating entity.

11. The method according to claim 10, wherein the transactions are at least partially carried out over a public network.

* * * * *